United States Patent
Hommel et al.

(10) Patent No.: US 9,991,945 B2
(45) Date of Patent: Jun. 5, 2018

(54) DEVICE AND METHOD FOR AIR-TO-GROUND COMMUNICATION OF AIRCRAFT

(71) Applicant: Lufthansa Systems GmbH & Co. KG, Raunheim (DE)

(72) Inventors: Peter Hommel, Bad Homburg (DE); Jörg Liebe, Wiesbaden (DE)

(73) Assignee: Lufthansa Systems GmbH & Co. KG, Raunheim (DE)

( * ) Notice: Subject to any disclaimer, the term of this patent is extended or adjusted under 35 U.S.C. 154(b) by 0 days. days.

(21) Appl. No.: 15/314,345

(22) PCT Filed: May 21, 2015

(86) PCT No.: PCT/EP2015/061273
§ 371 (c)(1),
(2) Date: Nov. 28, 2016

(87) PCT Pub. No.: WO2015/181045
PCT Pub. Date: Dec. 3, 2015

(65) Prior Publication Data
US 2017/0155442 A1 Jun. 1, 2017

(30) Foreign Application Priority Data
May 28, 2014 (DE) .......... 10 2014 210 204

(51) Int. Cl.
*H04M 1/10* (2006.01)
*H04B 7/185* (2006.01)
(Continued)

(52) U.S. Cl.
CPC ........ *H04B 7/18506* (2013.01); *H04W 16/28* (2013.01); *H04W 64/003* (2013.01); *H04W 72/046* (2013.01); *H04W 72/0453* (2013.01)

(58) Field of Classification Search
CPC ...... H01Q 13/02; H01Q 1/2291; H01Q 1/246; H01Q 1/28; H01Q 21/062; H01Q 21/205;
(Continued)

(56) References Cited

U.S. PATENT DOCUMENTS 4,298,877 A * 11/1981 Sletten ............. H01Q 1/1264
343/781 CA
5,878,345 A * 3/1999 Ray .................. H04B 7/18506
343/833

(Continued)

OTHER PUBLICATIONS

Dyadyuk et al., "Implementation of Wideband Digital Beam Forming in the E-band: Towards a Hybrid Array", Proceedings of the 40th European Microwave Conference, Sep. 2010, pp. 914-917.
(Continued)

*Primary Examiner* — Tan H Trinh
(74) *Attorney, Agent, or Firm* — The Webb Law Firm

(57) ABSTRACT

A device for air-to-ground communication between an aircraft and a ground station, said aircraft and said ground station each having antennas for directional radio data transmission. The data transmission is performed in a frequency band from 60 GHz to 90 GHz and the antenna of the ground station transmits and receives data exclusively in a range of angles α of at least 5 degrees in the upward direction relative to the horizontal plane.

23 Claims, 1 Drawing Sheet

(51) Int. Cl.
*H04W 72/04* (2009.01)
*H04W 64/00* (2009.01)
*H04W 16/28* (2009.01)

(58) Field of Classification Search
CPC . H01Q 25/00; H01Q 3/24; H01Q 3/26; H04B 7/18506; H04W 52/241; H04W 84/005
USPC ............ 455/431, 422, 63.1, 12.1, 427, 448, 455/562.1, 522, 517; 342/26 B, 361, 359, 342/765, 374, 368, 371, 367, 372; 343/705, 835; 375/219, 295, 259, 296, 375/285; 370/252, 317, 338
See application file for complete search history.

(56) References Cited

U.S. PATENT DOCUMENTS

| | | | | |
|---|---|---|---|---|
| 5,884,166 A * | 3/1999 | Ray | .................. | H04B 7/18506 343/833 |
| 6,208,859 B1 * | 3/2001 | Halvorson | ......... | H04B 7/18567 340/988 |
| 6,259,415 B1 * | 7/2001 | Kumpfbeck | ............ | H01Q 3/08 343/765 |
| 6,356,239 B1 * | 3/2002 | Carson | .................. | H01Q 1/125 342/375 |
| 6,701,126 B1 * | 3/2004 | Draim | ................. | B64G 1/1085 455/12.1 |
| 6,735,438 B1 * | 5/2004 | Sabatino | ............... | H01Q 1/246 343/705 |
| 7,848,698 B2 * | 12/2010 | Batcheller | ............... | G09B 9/08 434/2 |
| 8,467,733 B2 * | 6/2013 | Leabman | ............... | H01Q 1/246 455/431 |
| 8,614,643 B2 * | 12/2013 | Leabman | ............... | H01Q 1/246 342/367 |
| 2001/0039189 A1 * | 11/2001 | Cox | ................... | H04B 7/18504 455/431 |
| 2005/0271125 A1 * | 12/2005 | Chedester | ............... | H04B 1/40 375/219 |
| 2006/0178142 A1 * | 8/2006 | Lovberg | ................... | H04B 1/38 455/431 |
| 2006/0264242 A1 * | 11/2006 | Dent | .................. | H04B 7/18506 455/562.1 |
| 2008/0311944 A1 * | 12/2008 | Hansen | ...................... | G01S 1/02 455/517 |
| 2009/0117895 A1 * | 5/2009 | McGuffin | ........... | H04B 7/18506 455/431 |
| 2009/0186611 A1 * | 7/2009 | Stiles | .................. | H04B 7/18506 455/431 |
| 2009/0277630 A1 * | 11/2009 | McDaniel | ............... | E21B 43/26 166/250.1 |
| 2011/0032149 A1 * | 2/2011 | Leabman | ............... | H01Q 1/246 342/368 |
| 2011/0080980 A1 * | 4/2011 | Scott | ...................... | H01Q 3/245 375/340 |
| 2011/0169688 A1 * | 7/2011 | Wyler | .................... | H04B 7/195 342/354 |
| 2012/0063522 A1 * | 3/2012 | Fuss | ........................ | H01Q 1/28 375/259 |
| 2012/0200458 A1 * | 8/2012 | Jalali | ..................... | H01Q 1/2291 342/372 |
| 2012/0202430 A1 * | 8/2012 | Jalali | .................... | H01Q 1/2291 455/63.1 |
| 2012/0268319 A1 * | 10/2012 | Mitchell | .................. | H01Q 1/28 342/26 B |
| 2013/0044611 A1 * | 2/2013 | Jalali | .................. | H04B 7/18508 370/252 |
| 2013/0182790 A1 * | 7/2013 | Jalali | ........................ | H01Q 3/24 375/285 |
| 2013/0214969 A1 * | 8/2013 | Mitchell | ................. | H01Q 21/08 342/359 |
| 2014/0045420 A1 * | 2/2014 | Tong | .................. | H04B 7/18506 455/12.1 |
| 2014/0184455 A1 * | 7/2014 | Lea | ........................ | H01Q 9/285 343/745 |
| 2014/0200045 A1 * | 7/2014 | Jalali | ..................... | H01Q 1/2291 455/522 |
| 2014/0327577 A1 * | 11/2014 | Ozaki | ...................... | H01Q 3/26 342/367 |
| 2015/0061936 A1 * | 3/2015 | Love | ..................... | H01Q 1/246 342/361 |
| 2015/0236415 A1 * | 8/2015 | Bily | ......................... | H01Q 3/34 342/372 |
| 2015/0249293 A1 * | 9/2015 | Tran | ........................ | H01Q 3/24 342/367 |
| 2016/0205560 A1 * | 7/2016 | Hyslop | .................. | H04W 16/14 455/454 |
| 2016/0212669 A1 * | 7/2016 | Davis | .................... | H01Q 3/2605 |
| 2016/0275801 A1 * | 9/2016 | Kopardekar | ......... | G08G 5/0043 |
| 2017/0062927 A1 * | 3/2017 | Ma | ........................ | H04W 16/28 |

OTHER PUBLICATIONS

Wells, "Faster Than Fiber: The Future of Multi-Gb/s Wireless", IEEE Microwave Magazine, May 2009, pp. 104-112.

* cited by examiner

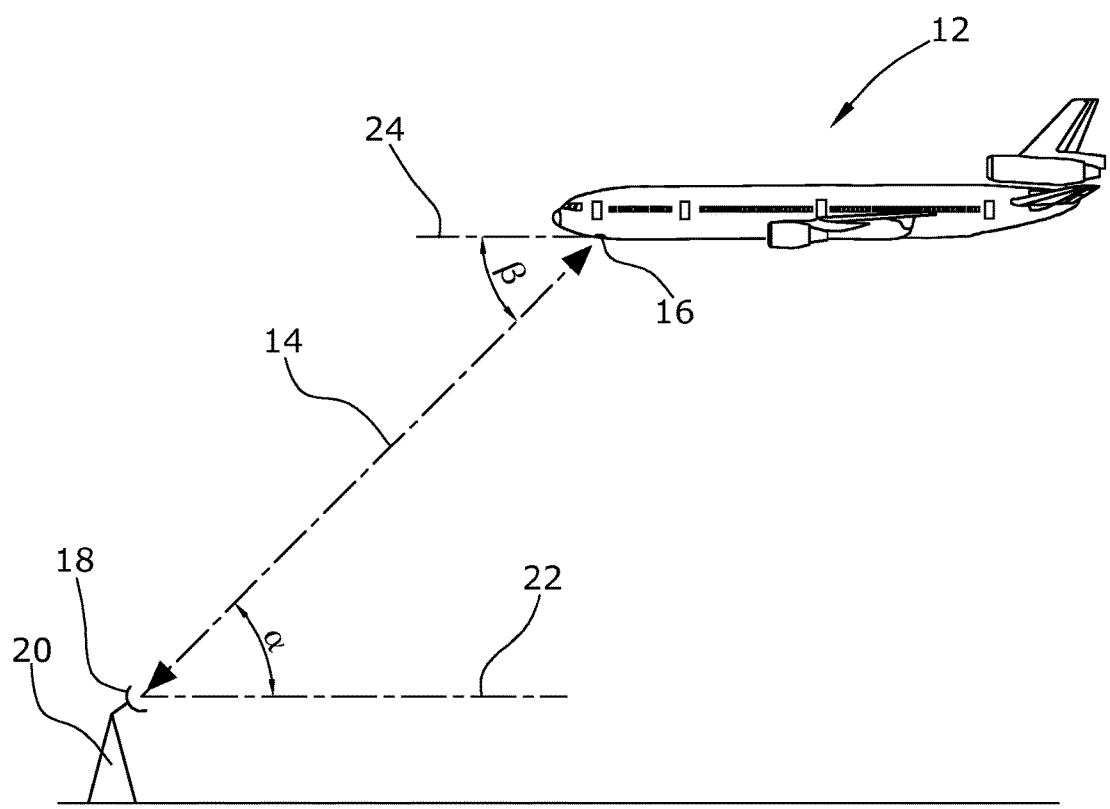

DEVICE AND METHOD FOR AIR-TO-GROUND COMMUNICATION OF AIRCRAFT

CROSS-REFERENCE TO RELATED APPLICATIONS

This application is the United States national phase of International Application No. PCT/EP2015/061273 filed May 21, 2015, and claims priority to German Patent Application No. 10 2014 210 204.9 filed May 28, 2014, the disclosures of which are hereby incorporated in their entirety by reference.

BACKGROUND OF THE INVENTION

Field of the Invention

The invention relates to a method for data transmission between an aircraft and at least one ground station.

Description of Related Art

Data transmission between aircraft and ground stations is of importance particularly in the field of passenger aviation. There exists an increasing need of for data transmission techniques which make it possible for passengers of an aircraft to do telephone calls or to surf in the internet. In the present text, aircraft are understood to comprise particularly airplanes, helicopters and spacecraft.

In data communication between ground stations and aircraft, it is difficult to allow a large number of passengers to perform data communication with sufficient bandwidth.

It is an object of the invention to provide an improved device for data transmission between at least one ground station and an aircraft, and to provide a corresponding method.

SUMMARY OF THE INVENTION

Data transmission between the aircraft and the ground station is carried out by radio in a frequency band from 60 GHz to 90 GHz. In this regard, it is of particular importance that the ground station will radiate and receive the radio waves at a minimum of 5 degrees in the upward direction, whereas a smaller angle will not allow for transmission and reception of radio waves. Thus, during flight, aircraft are within the reception range of the ground station while possible users proximate to the ground level who use the same frequency range cannot receive the data from the ground station and cannot establish a data connection to the ground station. Consequently, in an angular range below 5 degrees relative to the horizontal plane, no data can be received from the wound station and no data can be transmitted to the ground station.

The invention is based on the fundamental idea of allowing for a directional broadband radio data transmission between an aircraft and a ground station. The device of the invention for air to ground communication between an aircraft and a ground station comprises an aircraft station attached to the aircraft and a ground station, the aircraft station and the ground station communicating with each other. The broadband data transmission is possible in the frequency band from 60 GHz to 90 GHz while an interference with ground-proximate users of the same frequency range is prevented. In this frequency band, also referred to as E-band, data transmission is possible for a large number of passengers of an airplane with sufficient bandwidth for internet use. Thus, for air-to-ground communication, there is available, for the first time in an aircraft, a band width range of 30 GHz, i.e. a band width range exactly as large as the frequency range of 0-30 GHz which presently is used for radio communication in general.

With a channel width for air-to-ground communication (ATG) of only one GHz and a spectral efficiency 1, there is available, per aircraft, a data rate of one gigabit per second (Gbit/s). Assuming a number of 200 users among the passengers of the aircraft, this will result in a data rate of 50 Megabit per second (Mbit/s) per user/passenger.

A delay due to satellite communication does not occur because the data transmission between the ground station and the aircraft is carried out directly. Data transmission is performed in the manner of a pencil beam (pencil beam characteristic). A pencil-beam directional characteristic is understood to be a bundled directional characteristic in an angular range from ±0.5 degrees and −0.5 degrees around the main radiation direction. This means that the main lobe of the directional characteristic is in this angular range. Consequently, the main lobe of the directional characteristic of the antenna of the ground station cannot be pivoted below an angle of 5 degrees above the horizontal plane.

The pivoting of the main transmission/reception direction of the antennas of the ground station and/or of the aircraft is preferably possible by electronic beamforming. It is advantageous if the main transmission/reception direction can be pivoted about a vertical axis in any desired manner. Also a pivoting about a horizontal axis is of advantage wherein, for the antenna of the ground station, a pivoting to an angle smaller than 5 degrees relative to the horizontal line is not possible. In a corresponding manner, it is of advantage if the main transmission/reception direction of the antenna of the aircraft is possible only in an angular range from −5 degrees to −90 degrees about a horizontal axis in the downward direction.

An essential advantage of the use of the frequency band from 60 GHz to 90 GHz as proposed by the invention resides in that the usability and availability of licenses in this frequency range is much easier than in the conventionally used frequency ranges below 20 GHz or 30 GHz. Antennas for use of the E-band are simpler, less expensive and more easily installed than conventional antennas, especially than those of the Satcom technology. Data transmission, with about 20 ms, is much faster than that of the Satcom technology with about 600 ms. The bandwidth of the E-band is larger and, by electronic beamforming, interference or crosstalk with other ground stations or ground-proximate users of the E-band can be prevented.

Preferably, the E-band communication occurs within a frequency band of 70 to 80 GHz (E-band). This frequency band is characterized by intrinsic noninterference, inherent eavesdrop immunity and unlimited spectrum reusability because pencil beams are prerequisite to operate in MM spectrum.

The main advantage are the much larger bandwidth available at these higher frequencies and the consequent increase in data rates which can be provided. Additionally, transmission at E-band frequencies carries a very low risk of interference as it relies on highly focused, directive and narrow pencil beam transmissions. With spectrum allocation at 70-80 GHz, E-band offers a number of benefits including pencil beaming that enhances frequency review and interference protection. High gain narrow beam with directional antennas are the key to achieve interference protection and the ability to tap into huge available spectrum bandwidth.

The pencil beam property facilitates a high degree of frequency review in the deployment of air to ground links and reduces citizens' exposure to electromagnetic fields. This is a clear advantage from a regulatory point of view, since co-frequency sharing with other systems is a given and therefore regulators are expected to quickly provide air to ground authorizations. E-band spectrum is low cost and characterized through rapid license availability. Links are licensed under a "light license" process, whereby licenses, can be obtained quickly and cheaply. Such licenses provide the full benefits of traditional spectrum licenses, but at a frication of the cost and application time.

The ground station (base station) may be comprised by n (natural number) individual radio segments each covering $$\frac{1}{n}$$

of 360 degrees in azimuth and/or elevation. For example, 4 or 8 individual radio segments could cover either 90 degrees (4 segments) or 45 degrees (8 segments) in azimuth and 90 degrees in elevation. The base station can either handle a 90 or 45 degrees segment configuration. The base station is software controlled and the configuration is loaded at boot time. The base station houses a radio module and a phased array antenna module in one assay. It manages one or more E-band channels which equates to approximately 1 Gbit/s per channel. The same spectrum is reused by the other base stations. Each individual radio phased array antenna has a number of antenna elements to form an electronically steerable pencil beam. The decision for 4 or 8 sector base station configuration roll-out is dependent on the expected aircraft density within the airspace. Each base station can entertain up to 8 aircraft stations by means of TDD beam switching. This totals to 64 aircraft stations per base station with 8 individual radio segments.

The aircraft station may have 4 switchable antenna sectors for basic directivity. The antenna sectors houses a low noise amplifier and a phased array antenna. The electronically steerable phased array antenna covers 90 degree in azimuth and pitch. Each antenna sector may have 64 phased array elements. The 4 antenna assemblies are installed on the underside of the aircraft fuselage.

The aircraft station has a memory in which a map with the geographical coordinates (elevation over sea level, longitude and latitude) of all base stations is stored. This map is loaded at boot time. The aircraft station knows its own (the aircraft's) coordinates (height over sea level, longitude and latitude). The aircraft station is connected to the aircrafts' ARINC bus and reads the permanently updated positional data of the bus.

For initial target acquisition, the aircraft inertia navigation system (INS) determines the actual position, acceleration and deceleration of the aircraft within the airspace. The INS is connected to the ARINC bus and writes the permanently updated positional data to the bus. With positional and acceleration/deceleration data the aircraft station is computing the trajectory of the aircraft. Target acquisition is initiated by the aircraft station.

If no base station is active, every 30 ms the aircraft station sends a radio ping to the nearest base station and switches then into receive mode receiving from a certain base station direction only. The pings are repeated for the duration of 10 s. If no response is received during the 10 s ping cycle, the next nearest base station inside the aircraft stations receive radio is pinged and so on, until a base station is establishing a TDD connection with the aircraft station. The ping is comprised of the actual position and trajectory of the aircraft station. The base station is switching to the house keeping cycle every second for the duration of 50 ms. The base station switches to Omni-directional receive mode during the house keeping cycle. If a base station is receiving and registering the radio ping of an aircraft station, it reads the positional and trajectory data. The base station establishes a TDD radio connection with the aircraft station by generating a pencil beam towards the expected position of the aircraft station. After connection establishment, the house keeping cycle is synchronized across the base station and the aircraft station.

For base station switching, all base stations are connected to a central monitor and control system (CMCS) which will optimize and rearrange the connections as needed. The CMCS generates a 3D map of all base stations and connected aircraft. The CMCS optimizes the connections and load distribution of all base stations on a per base station basis. The switch procedure is the same as for initial target acquisition except that it's initiated by the CMCS.

For target tracking, after TDD connection establishment, the aircraft station is permanently sending its updated positional and trajectory data to the base station. The base station steers the beam position according to the updated positional and trajectory data of the aircraft station for precise alignment. The base station is forwarding the updated positional data, as received by the aircraft station, to the CMCS. Doppler shift compensation and avoidance is performed with factoring in the trajectory data of the aircraft station. The central monitor and control system (CMCS) is calculating a 3-dimensional airspace map of the air traffic from the received positional and trajectory data of the aircraft station received via the base station. The CMCS optimizes the connections and load distribution of all base stations on a per base station basis.

If all aircraft in a given airspace were to participate on the E-band air to ground system of the invention, the 3-dimensional airspace map could be used by air traffic control to control the traffic of the aircraft since all aircraft and their trajectory are present in the map and can be displayed.

In addition, the air to ground communication channel of the invention can be used by qualified personnel to control the aircraft from ground, for example in cases of emergency where the flight deck crew is incapacitated or the aircraft is hijacked. The air to ground aircraft radio would connect to the flight management system (FMS) or the autopilot (AP) through the ARINC bus. Also, a direct cable connection could be wired to establish a tamper proof direct connection.

BRIEF DESCRIPTION OF THE DRAWINGS

An exemplary embodiment of the invention will be explained in greater detail hereunder with reference to the FIGURE.

FIG. 1 is a schematic view of the exemplary embodiment.

The aircraft 12 in the exemplary embodiment is a passenger airplane with several hundreds of passengers, each of them using, e.g. per smartphone or tablet PC, a radio data connection 14 between an antenna 16 of aircraft 12 and an antenna 18 of the ground station 20. The antennas 16, 18 are E-band antennas whose main radiation/reception direction is variable through electronic beamforming. Aboard aircraft 12, the passengers can receive, on their terminals and e.g. per WLAN, the data picked up by antenna 16. Data transmission 14 is performed in the E-band, i.e. in a frequency range from 60 GHz to 90 GHz.

The antenna 18 of ground station 20 transmits and receives the data of data transmission 14 at an angle α of about 30 degrees above the horizontal plane 22. According to the invention, the angle α cannot be smaller than 5 degrees. At an angle α below 5 degrees (main radiation direction), the antenna 18 of ground station 20 will not transmit and receive data. By electronic beamforming, the main radiation/reception directions of ground antenna 18 and airplane antenna 16 are automatically adjusted to each other in such a manner that a direct connection exists and will be maintained between the antennas 16, 18 while the aircraft 12 is moving. In FIG. 1, the antenna 16 of aircraft 12 transmits the data of data transmission 14 at an angle β of −20 degrees (main radiation direction) below the horizontal plane 24. Said angles α and β correspond to each other as alternate angles. While the aircraft 12 is moving over ground station 20, an electronic beam control is performing an automatic follow-up of the directional characteristics and the main lobes of antennas 16, 18, thus maintaining the direct data connection 14.

The invention claimed is:

1. A device for air-to-ground communication between an aircraft and a ground station, said aircraft and said ground station each comprising an antenna array for directional radio data transmission,
wherein said data transmission is performed in a frequency band from 60 GHz to 90 GHz, wherein the ground station transmits and receives data exclusively in a range of angles α of at least 5 degrees in the upward direction relative to the horizontal plane, wherein the ground station prevents transmission and reception of data below said angle α of 5 degrees in the upward direction relative to the horizontal plane such that the ground station cannot radiate data below the angle α of at least 5 degrees relative to the horizontal plane and cannot receive data below the angle of at least 5 degrees relative to the horizontal plane.

2. The device according to claim 1, wherein the directional characteristic of the antenna array of the ground station and the antenna array of the aircraft is variable by electronic beamforming.

3. The device according to claim 1, wherein a main lobe of the antenna array of the ground antenna can be arbitrarily pivoted about a vertical axis and is pivotable about a horizontal axis not below said angle α of 5 degrees, wherein the main lobe of the antenna array cannot be pivoted below the angle α of 5 degrees relative to the horizontal plane, and wherein each antenna of the antenna array of the ground station cannot radiate data below the angle α of at least 5 degrees relative to the horizontal plane.

4. The device according to claim 1, wherein a main lobe of the antenna array of the aircraft is arbitrarily pivotable about a vertical axis.

5. The device according to claim 1, wherein a main lobe of the antenna array of the aircraft is pivotable exclusively in a range of angles θ from −5 degrees to −90 degrees relative to a horizontal plane.

6. The device according to claim 1, wherein the data transmission is performed exclusively in the E-band.

7. The device according to claim 1, wherein the antenna array of the ground station and the antenna array of the aircraft are each designed to radiate radio waves in a pencil beam.

8. The device according to claim 1, wherein the ground station and the aircraft are designed for direct data transmission between the antenna array of the ground station and the antenna array of the aircraft.

9. The device according to claim 1, wherein the antenna array of the aircraft and the antenna array of the ground station are divided into n segments each covering $$\frac{1}{n}$$

of 360 degrees in azimuth and/or in elevation, respectively.

10. The device according to claim 1, further comprising a data storage memory in the aircraft, the data storage memory comprising the geographical locations of a plurality of ground stations.

11. The device according to claim 1, further comprising a central monitor and control system adapted to generate a 3-dimensional map of a plurality of ground stations and of at least one aircraft communicating with said central monitor and control system via radio.

12. A method for data transmission between a ground station and an aircraft, said ground station and said aircraft being each provided with a radio antenna array for directional radio data transmission between each other, the method comprising:
performing the data transmission between the antenna array of the ground station and the antenna array of the aircraft exclusively in a frequency band from 60 GHz to 90 GHz; and
preventing, with the ground station, transmission and reception of data below an angle α of 5 degrees in the upward direction relative to the horizontal plane such that the ground station cannot radiate data below the angle α of at least 5 degrees relative to the horizontal plane and cannot receive data below the angle of at least 5 degrees relative to the horizontal plane.

13. The method according to claim 12, wherein the ground station and the aircraft are each designed for data transmission in the E-band.

14. The method according to claim 12, wherein a transmission and reception direction of the antenna array of the ground station and/or the antenna array of the aircraft is pivotable at random about a vertical axis.

15. The method according to claim 12, wherein a transmission/reception direction of the antenna array of the ground station is pivotable about a horizontal axis not below said angle α of 5 degrees, wherein the transmission/reception direction of the antenna array cannot be pivoted below the angle α of 5 degrees relative to the horizontal plane, and wherein each antenna of the antenna array of the ground station does not radiate data below the angle α of at least 5 degrees relative to the horizontal plane.

16. The method according to claim 12, wherein a transmission and reception direction of the antenna array of the aircraft is pivotable exclusively in a range of angles θ from −5 degrees to −90 degrees relative to a horizontal plane.

17. The method according to claim 12, wherein the data transmission between the antenna array of the aircraft and the antenna array of the ground station is performed directly.

18. The method according to claim 12, wherein, after leaving the transmission and reception range of the ground station, the aircraft automatically seeks and establishes contact to a further ground station in whose transmission and reception range the aircraft is located.

19. The method according to claim 12, wherein the antenna array of the aircraft and the antenna array of the ground station comprise phased array antenna segments each covering $$\frac{1}{n}$$

of 360 degrees in azimuth and/or elevation.

20. The method according to claim 12, further comprising:
storing, with a data storage memory of the aircraft, the geographical locations of a plurality of ground stations; and
generating, with a central monitor and control system within the aircraft, a map comprising the locations of said ground stations and of the aircraft.

21. The method according to claim 12, further comprising:
calculating, with a central monitor and control system a 3-dimensional airspace map showing the positions of a plurality of ground stations and at least one aircraft, wherein the map is used to control air traffic of the aircraft shown in the map.

22. The method according to claim 12, further comprising:
remotely controlling, with the data transmission between the antenna array of the ground station and the antenna array of the aircraft, the aircraft from the ground station.

23. The method according to claim 12, further comprising:
steering, by employing positional and trajectory data of the aircraft and the ground station stored and frequently updated in a central monitor and control system, a main lobe of the antenna array of the aircraft and/or the antenna array of the ground station into the direction of a respective aircraft antenna or ground antenna.

* * * * *

UNITED STATES PATENT AND TRADEMARK OFFICE
CERTIFICATE OF CORRECTION

PATENT NO. : 9,991,945 B2
APPLICATION NO. : 15/314345
DATED : June 5, 2018
INVENTOR(S) : Peter Hommel et al.

Page 1 of 1

It is certified that error appears in the above-identified patent and that said Letters Patent is hereby corrected as shown below:

Claims

Column 5, Line 58, Claim 5, delete "θ" and insert -- β --

Column 6, Line 58, Claim 16, delete "θ" and insert -- β --

Column 8, Line 1, Claim 21, delete "system" and insert -- system, --

Signed and Sealed this
Fourth Day of September, 2018

Andrei Iancu
*Director of the United States Patent and Trademark Office*